(12) United States Patent
Sridhar et al.

(10) Patent No.: US 9,154,588 B2
(45) Date of Patent: *Oct. 6, 2015

(54) BACKWARD LOOKING ROBUST HEADER COMPRESSION RECEIVER

(71) Applicant: THOMSON LICENSING, Issy de Moulineaux (FR)

(72) Inventors: Avinash Sridhar, Pennington, NJ (US); David Brian Anderson, Hamilton, NJ (US); David Anthony Campana, Kirkland, WA (US)

(73) Assignee: Thomson Licensing, Issy les Moulineaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/704,356

(22) Filed: May 5, 2015

(65) Prior Publication Data

US 2015/0237179 A1    Aug. 20, 2015

Related U.S. Application Data

(63) Continuation of application No. 13/382,612, filed on Jan. 6, 2012, now Pat. No. 9,055,034, which is a continuation of application No. PCT/US2010/001773, filed on Jun. 18, 2010.

(60) Provisional application No. 61/270,466, filed on Jul. 8, 2009.

(51) Int. Cl.
| | |
|---|---|
| *H04L 29/06* | (2006.01) |
| *H04W 28/06* | (2009.01) |
| *H04L 12/70* | (2013.01) |
| *H04W 36/00* | (2009.01) |
| *H04B 1/707* | (2011.01) |

(52) U.S. Cl.
CPC ............. *H04L 69/22* (2013.01); *H04L 65/607* (2013.01)

(58) Field of Classification Search
CPC ..... H04L 69/04; H04L 65/604; H04L 65/608; H04L 69/28
See application file for complete search history.

(56) References Cited

U.S. PATENT DOCUMENTS

| 6,850,740 B1 | 2/2005 | Haartsen |
|---|---|---|
| 7,061,936 B2 | 6/2006 | Yoshimura et al. |

(Continued)

FOREIGN PATENT DOCUMENTS

| KR | 2008012441 | 2/2008 |
|---|---|---|
| WO | WO2006052184 | 5/2006 |
| WO | WO2007112140 | 10/2007 |

*Primary Examiner* — Un C Cho
*Assistant Examiner* — Peian Lou
(74) *Attorney, Agent, or Firm* — Robert D. Shedd; Reitseng Lin

(57) ABSTRACT

Robust Header Compression (ROHC) offers a way to compress packet header information for more efficient transmission of data. The compression is achieved through various confidence modes set up by the transmitter and the receiver. The Initialization and Refresh state (IR) is the first state of the compressor. This provides a complete, uncompressed context of the data that is being transmitted. In typically operation, the ROHC compressor will periodically transmit IR packets providing context information allowing the ROHC decompressor to decompress one or more packets following the IR packet. However, under certain conditions such as decompressor start-up, it is possible for the decompressor to miss an IR packet. Exemplary methods and apparatus are described in which a decompressor uses a later-received IR packet to decompress earlier packets for which the decompressor had not received context information.

9 Claims, 4 Drawing Sheets

(56) References Cited

U.S. PATENT DOCUMENTS

| | | |
|---|---|---|
| 2001/0030963 A1 | 10/2001 | Yoshimura et al. |
| 2006/0056404 A1 | 3/2006 | Mueckenheim et al. |
| 2006/0187846 A1 | 8/2006 | Pelletier et al. |
| 2007/0258458 A1 | 11/2007 | Kapoor |
| 2008/0151861 A1 | 6/2008 | Zhang |
| 2008/0253311 A1 | 10/2008 | Jin |

FIG. 4A

| Add-CID (1) | |
|---|---|
| 1 1 1 1 1 0 | D |
| CID Info (0-2) | |
| Profile (1) | |
| CRC (1) | |
| Static chain (Variable) | |
| Dynamic chain (Variable) | |
| Payload (Variable) | |

FIG. 4B

| Add-CID (1) |
|---|
| 1 1 1 1 0 0 0 |
| CID Info (0-2) |
| Profile (1) |
| CRC (1) |
| Dynamic chain (Variable) |
| Payload (Variable) |

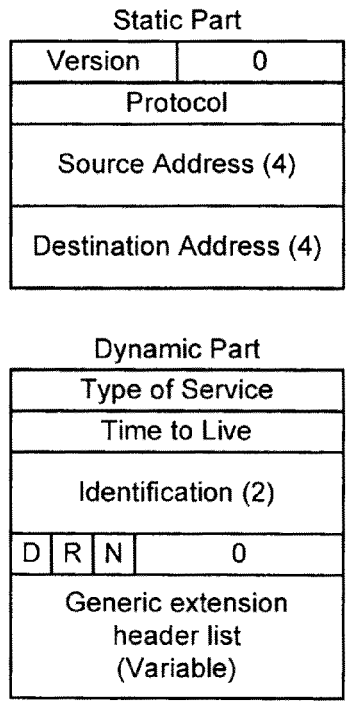
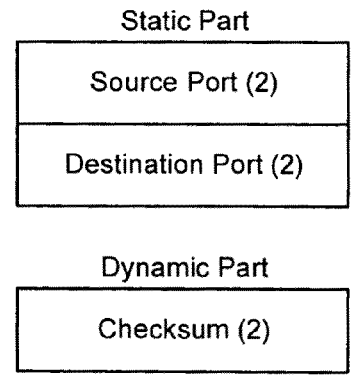
FIG. 5B
FIG. 5A
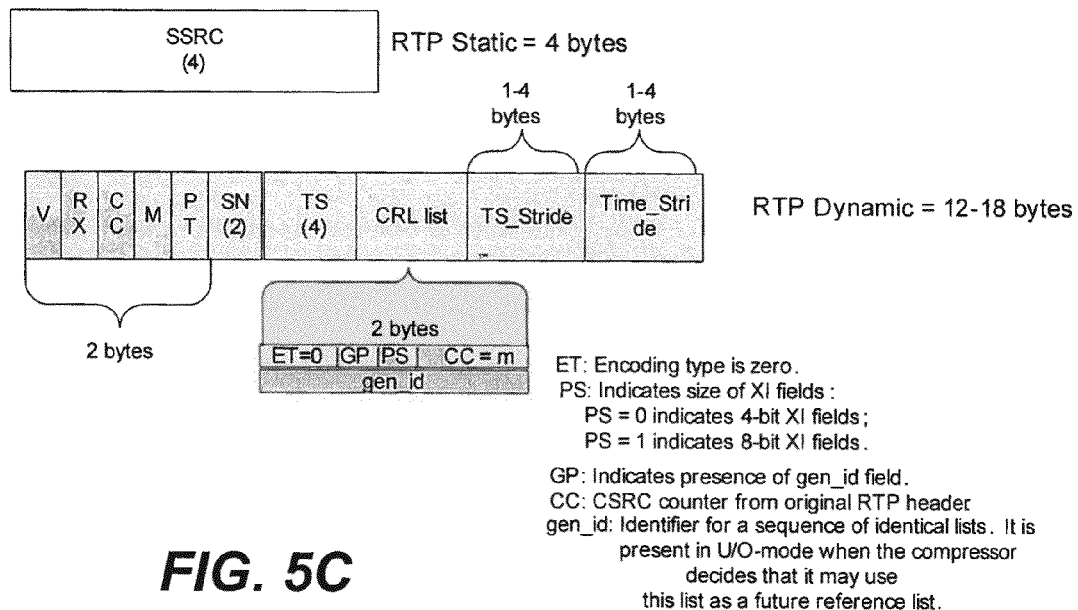
FIG. 5C

BACKWARD LOOKING ROBUST HEADER COMPRESSION RECEIVER

RELATED PATENT APPLICATIONS

This application is a continuation of U.S. patent application Ser. No. 13/382,612, filed Jan. 6, 2012, which claims the benefit, under 35 U.S.C. §365 of International Application PCT/US2010/001773, filed Jun. 18, 2010, which was published in accordance with PCT Article 21(2) on Jan. 13, 2011 in English and which claims the benefit of U.S. provisional patent application No. 61/270,466, filed Jul. 8, 2009.

FIELD OF INVENTION

The present invention generally relates to digital communications systems and methods and, more particularly, to packet communications systems and methods.

BACKGROUND

A problem with Internet Protocol (IP) over wireless links when used for functions such as interactive voice conversations or video, for example, is the large header overhead. Audio and video data for IP telephony is typically carried using Real-time Transport Protocol (RTP). A packet will then, in addition to link layer framing, have an IP header (20 octets for IPv4), a User Datagram Protocol (UDP) header (8 octets), and an RTP header (12 octets) for a total of 40 octets. With IPv6, the IP header is 40 octets for a total of 60 octets. The size of the payload of the packet depends on the speech coding and frame sizes being used and may be as low as 15-20 octets.

Robust Header Compression (ROHC) offers a way to compress header information for more efficient transmission of data. (See Network Working Group, Request for Comments 3095.) Compression can be achieved, for example, by recognizing that some header fields have well known values a priori and do not have to be sent at all; and some header fields are constant throughout the lifetime of a packet stream and need only be sent once at the beginning of a packet stream. In ROHC, relevant information from past packets is maintained in a context. The context information is used to compress and decompress subsequent packets. An Initialization and Refresh (IR) packet provides a full uncompressed context of the data that is being transmitted.

The compressor and decompressor update their contexts upon the occurrence of certain events. Impairment events may lead to inconsistencies between the contexts of the compressor and decompressor, which inconsistencies may cause incorrect decompression. In a typical streaming environment, packets are received sequentially. Any packet loss could potentially degrade service until a new context rich packet, such as an IR packet, is received by the decompressor.

Under a burst model of operation, the same principles apply. In burst operation, however, because data is sent out in bursts, the receiver has access to a period of time of data. Although burst operation may offer bandwidth utilization efficiencies, it is not error free. If during the transmission of a burst there are losses, the receiver can potentially throw out an entire burst containing multiple packets thereby, degrading the quality of service, often more so than in a streaming mode of operation.

Burst operation is used in a variety of systems, including digital broadcast systems such as systems based on the Advanced Television Systems Committee Mobile/Handheld (ATSC-M/H) standard, among others. In such systems, data for multiple services are multiplexed on a given physical channel in bursts of data. As such, a receiver will receive the data for a selected service in periodic bursts rather than as a steady stream. This results in the receiver suddenly having a burst of data available to it and then having to wait for the next burst of data. Each burst may represent, for example, a second's worth of streaming audio and/or video content.

The services offered to the receiver, however, such as video and audio over RTP, may be over mechanisms that are modeled on the concept of a steady stream of data. Using the streaming model, packets are received sequentially in time. Before receiving a later packet, the receiver receives all of the packets between the current packet and the later packet. This conceptually differs from the burst model, in which the receiver at one instance receives a full set of packets representing some time period.

SUMMARY

In an exemplary embodiment, a method is disclosed in which a Robust Header Compression (ROHC) decompressor uses a later-received context-rich packet to decompress previously received packets for which no context information was received. The exemplary ROHC decompressor, instead of throwing out packets for which it lacks any contextual information, uses a later-received context-rich packet, such as an IR packet, to re-create the context information pertaining to the previously received packets. The context information thus re-created is then used to decompress the previously received packets.

In view of the above, and as will be apparent from the detailed description, other embodiments and features are also possible and fall within the principles of the invention.

BRIEF DESCRIPTION OF THE FIGURES

Some embodiments of apparatus and/or methods in accordance with the present invention are now described, by way of example only, and with reference to the accompanying figures in which:

FIGS. 4A and 4B show the formats of IR and IR-DYN packets, respectively;

FIGS. 5A through 5C show the static and dynamic parts of an ROHC IR packet header for Internet Protocol version 4 (IPv4), User Datagram Protocol (UDP), and Real-time Transport Protocol (RTP) subheaders, respectively.

DESCRIPTION OF EMBODIMENTS

Other than the inventive concept, the elements shown in the figures are well known and will not be described in detail. For example, other than the inventive concept, familiarity with packet data communications, including Internet Protocol (IP), User Datagram Protocol (UDP), Real-Time Transport Protocol (RTP), and Robust Header Compression (ROHC), and broadcast systems such as ATSC-M/H or DVB-H is assumed and not described herein. It should also be noted that aspects of the inventive concept may be implemented using conventional programming techniques, which, as such, will not be described herein. Finally, like-numbers on the figures represent similar elements.

The inventors have discovered that burst modes present unique challenges to communication. In particular, the inventors have recognized that the use of ROHC, along with, for example, an underlying protocol of RTP, presents particular challenges. As is known, ROHC uses an expanded header for a given (underlying) protocol, as well as including data formatted according to the underlying protocol (for example, RTP). As described above, ROHC uses IR packets to transmit certain control information. In a burst mode, the inventors have recognized that if an IR packet is lost, has errors, or is otherwise not usable at the receiver, then the receiver might ordinarily throw out the data packets that depended on that lost IR packet.

In an exemplary embodiment, a later received IR packet can be used to determine, or estimate, the values for various pieces of information in the lost IR packet. In an exemplary embodiment, only the information that is used in decoding the data packets is determined or estimated. In other embodiments, the entire IR packet is determined or estimated.

Figure 1:
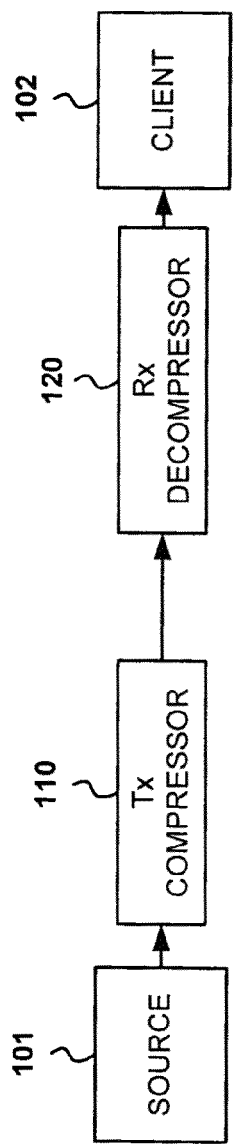
FIG. 1 shows a schematic representation of a typical Robust Header Compression (ROHC) system.

FIG. 1 shows a schematic representation of a typical system employing Robust Header Compression (ROHC). RFC 3095 describes ROHC as well as its application to various underlying protocols including RTP, among others. As shown in FIG. 1, a typical ROHC scheme includes a source 101 of data packets coupled to a client 102 via a ROHC-compliant compressor or transmitter 110 and a ROHC-compliant decompressor or receiver 120. Source 101 and compressor 110 are typically co-located, as are client 102 and decompressor 120, but they need not be. Compressor 110 and decompressor 120 may be coupled by any suitable wired or wireless link or links.

Based on the data that is being transmitted, ROHC can operate in one of three modes: Unidirectional Mode (U-Mode), Optimistic Mode (O-Mode), or Reliable Mode (R-Mode). In U-Mode, there is assumed to be no feedback channel. O- and R-Modes include a feedback mechanism, whereby compressor 110 can vary the level of compression used based on feedback from decompressor 120.

ROHC operation typically starts with the transmission of an Initialization and Refresh (IR) packet. The IR packet is an uncompressed packet that contains full contextual information about the profile of the data that is being transmitted. In a unidirectional mode of operation (U-Mode), packets are transmitted from compressor 110 to decompressor 120 without feedback. Because compressor 110 does not receive feedback indicating what information was not received by decompressor 120, ROHC U-Mode includes a timeout mechanism whereby the compressor 110 switches between different modes of compression.

Figure 2:
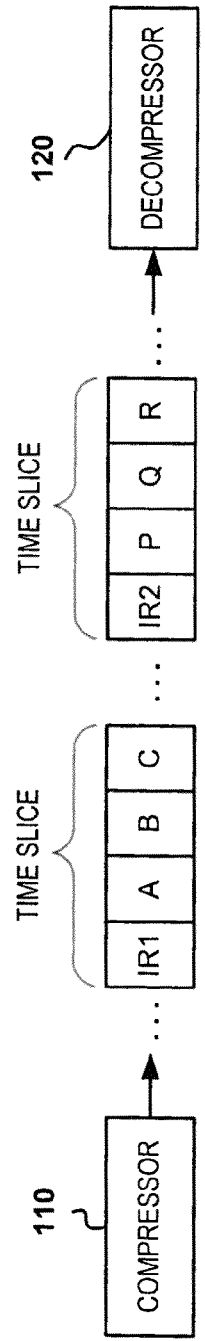
FIG. 2 illustrates the transmission of packets, including the periodic transmission of Initialization and Refresh (IR) packets, in the ROHC system.

In the U-Mode of operation, as may be used for example in ATSC-M/H transmission, an IR packet, which contains the full context, can be transmitted periodically. Such operation is illustrated in FIG. 2. An IR packet can either contain the static and dynamic parts of the contextual information in an uncompressed form, or it can contain only the static parts. A related packet type, the IR-DYN packet, contains only the dynamic parts of the contextual information. Compressor 110 can switch between sending these two types of IR packets at a fixed interval. This is particularly useful since there is no feedback provided in U-mode. The formats of IR and IR-DYN packets are described below in greater detail.

As shown in FIG. 2, IR packet IR1 contains the contextual information to decompress the packets A, B and C, whereas IR packet IR2 contains the contextual information to decompress the packets P, Q and R. In the illustrative scenario of FIG. 2, the packets IR1, A, B, and C are transmitted together in a time slice and the packets IR2, P, Q and R are transmitted together in a later time slice. Time slicing is a method of transmission in which each transmission is sent out as a burst of data over a period of time and is commonly employed in unidirectional broadcast systems such as ATSC-M/H or DVB-H. In an exemplary embodiment, each time slice contains one IR packet and the packets to which the contextual information contained in the IR packet pertains. Each time slice starts with an IR packet. A time slice may contain different numbers of packets and IR packets than those illustrated for this embodiment.

Figure 3:
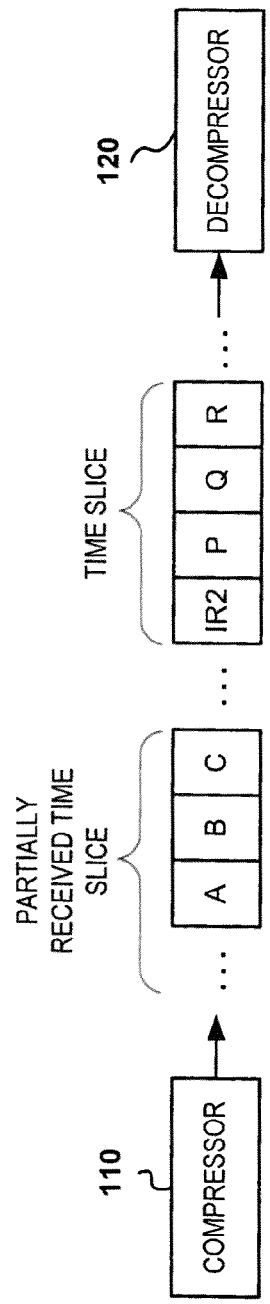
FIG. 3 illustrates a scenario in which the first IR packet in the transmission of FIG. 2 is missing.

In cases such as where decompressor 120 switches ON during the transmission of a time slice of data, decompressor 120 may receive some packets of the time slice while missing the IR packet preceding said packets. As such, decompressor 120 will have received packets without the associated IR packet needed to decompress them. Such a scenario is illustrated in FIG. 3, in which packets A, B and C are received, but IR packet IR1 is not. Because the IR packet associated with packets A, B and C was not received by decompressor 120, the contextual information contained therein for decompressing packets A, B and C is not available to decompressor 120. It is possible, however, that one or more subsequent IR packets are later received in a subsequent slice. In the scenario illustrated in FIG. 3, IR packet IR2 preceding the packets P, Q and R is received by decompressor 120. As mentioned, however, an IR packet contains contextual information for the packets following it.

In accordance with an exemplary embodiment of the disclosure, a ROHC decompressor uses the contextual information contained in an IR packet to decompress packets preceding the IR packet. In the illustrative scenario depicted in FIG. 3, decompressor 120 uses contextual information contained in IR packet IR2 to decompress packets A, B and C, for which contextual information is otherwise lacking. This is possible because successive IR packets, such as IR2 and IR1, will contain information in common. Moreover, some or all of the information in a previous, missing IR packet can be re-created from a subsequent IR packet. For example, the RTP Timestamp (TS), Timestamp Stride (TS_Stride), and RTP Sequence Number (SN) in IR2 can be used to reconstruct the corresponding information in IR1.

FIG. 4A shows the format of an RTP IR packet and FIG. 4B shows the format of an RTP IR-DYN packet. (FIGS. 4A and B are derived from RFC 3095.) The IR packet type communicates the static part of the context, i.e., the values of the constant-SN functions. It can optionally also communicate the dynamic part of the context, i.e., the parameters of non-constant-SN functions. It can also optionally communicate the payload of an original packet, if any. The IR-DYN packet type communicates the dynamic part of the context, i.e., the parameters of non-constant-SN functions. Each field of the packets is shown with the number of octets of each field in parentheses.

As shown in FIGS. 4A and 4B, each IR and IR-DYN packet includes context identifier information (Add-CID, CID) which allows multiple packet streams with different contexts to share a channel. The second octet of each packet identifies the packet type (IR or IR-DYN) and in the case of an IR packet, indicates (bit D) whether a dynamic chain field is present.

As shown in FIGS. 4A and 4B, each IR and IR-DYN packet includes a header compression profile octet which specifies how to compress the headers of a certain kind of packet stream over a certain kind of link. Compression profiles provide the details of the ROHC header compression framework.

As shown in FIGS. 4A and 4B, each IR and IR-DYN packet header includes a Cyclic Redundancy Check (CRC) octet for checking the integrity of the header.

In an exemplary embodiment, the IR Header information of FIGS. 4A and 4B, including the fields for Add-CID, Packet Header, Profile, and CRC are not re-created for the lost IR packet because they are not used in decoding the data packets.

In an IR packet header, the CRC octet is followed by a static chain field which may be followed by a dynamic chain field. In an IR-DYN packet header, the CRC octet is followed by a dynamic chain field. The header of an IR or IR-DYN packet is followed by the payload of the corresponding original packet, if any.

The static chain field contains a chain of static subheader information, whereas the dynamic chain field contains a chain of dynamic subheader information. What dynamic information is present is inferred from the static chain field. The subheaders which are compressible are split into static and dynamic parts.

FIGS. 5A through 5C show the static and dynamic parts of an ROHC IR packet header for Internet Protocol version 4 (IPv4), User Datagram Protocol (UDP), and Real-time Transport Protocol (RTP) subheaders, respectively. (FIGS. 5A-C are derived from RFC 3095.) As discussed below, however, the contents of the UDP and IP headers typically change less frequently than the contents of the RTP header.

In the scenario of FIG. 3, in which packet IR1 is lost, the static and dynamic information pertaining to the packets A, B and C are lost. The subsequent IR packet IR2, however, is received and typically contains the same static information and some minor changes to the dynamic information that was contained in lost packet IR1. As such, static and dynamic information contained in packet IR2 can be re-used to recreate static and dynamic information contained in lost packet IR1. In an exemplary embodiment, the static information of packet IR2 is re-used as the static information of packet IR1 and the dynamic and/or static information of packet IR2 is used to derive the dynamic information of packet IR1.

For the IP and UDP packet headers, static information that can be re-used includes the source and destination addresses and ports. In a broadcast application, as contemplated in an exemplary embodiment, the source and destination network addresses and ports typically do not change frequently.

The same can be said of the dynamic part of the IPv4 header (FIG. 5A) which contains some network parameters such as, for example, Time to Live (TTL) and Type of Service (TOS). This information changes infrequently and can be re-used for packets for which the corresponding IR packet is unavailable.

In the case of the RTP header of an IR packet, such as shown in FIG. 5C, there is additional information that is to be re-created. As shown in FIG. 5C, the static part of the RTP header contains the Synchronization source identifier (SSRC) for the stream. The SSRC identifies the stream and is not expected to change from one IR packet to the next IR packet. As such, the SSRC from the next received IR packet can be assumed to be the same as the SSRC from the lost IR packet. Because such information will not change significantly over time, it can be re-used.

In the dynamic part of the RTP header (FIG. 5C), the first two bytes (including version number V, RX, CC, M, and payload type PT) are not typically expected to change from one IR packet to the next IR packet. As such, in an exemplary embodiment, these two bytes from the next received IR packet can be assumed to be the same as the corresponding two bytes from the lost IR packet and can be re-used.

The Sequence Number (SN) of IR packet IR2 can be used to derive the Sequence Numbers for the previous packets. As part of RTP, SN increments from one packet to the next packet. The SN of the lost IR packet can be determined from the SN of the received IR packet. For example, if there are "x" RTP data packets between the lost IR packet and the received IR packet, then the SN of the lost IR packet can be determined by decrementing the SN of the received IR packet by "x"+1. Thus, as an illustration, if packet IR2 shown in FIG. 3 has a SN of 4, then it can be deduced that the preceding packets A, B and C would have SNs of 1, 2 and 3, respectively.

As shown in FIG. 5C, the dynamic part of the RTP header also includes Timestamp (TS), TS_Stride and Time_Stride fields. TS_Stride and Time_Stride provide the changes between successive RTP timestamps and successive absolute timestamps (wall clock), respectively. More specifically, TS_Stride tells the receiver the expected change in RTP timestamp from the previous IR packet. Accordingly, the RTP timestamp of the lost IR packet can be determined from the RTP Timestamp and TS_Stride of the received IR packet. Additionally, TS_Stride and Time_Stride are generally not expected to change from one IR packet to the next IR packet. For example, if there are "x" data RTP packets between the lost IR packet and the received IR packet, then the Timestamp of the lost IR packet can be determined by subtracting ((x+1)*TS_Stride) from the RTP Timestamp of the received IR packet. As such, by way of illustration, if IR packet IR2 has a Timestamp value of 100 and a TS_Stride value of 10, then it can be deduced that the preceding packets A, B and C would have Timestamp values of 70, 80 and 90, respectively.

As shown in FIG. 5C, the dynamic part of the RTP header also includes a CRL list field. The CRL list is generally not expected to change from one IR packet to the next IR packet. Accordingly, the CRL list from the lost IR packet can be assumed to be the same as the CRL list from the next received IR packet.

Hence, using a later IR packet, most of the information needed, e.g., the payload type (PT), the RTP version (V), and the Timestamp (TS) of the RTP packet can be re-created and applied to the packets lacking contextual information. This leads to a more robust service. This also helps the receiver tune faster since it can decode information from the packets even though it missed the reception of the packets' associated IR packet.

In exemplary embodiments, because of the signaling requirements relating to certain fields in ROHC headers, it may be necessary to rebuild the packets A, B and C in a reverse sequence. For example, in the case of RTP, packet C is rebuilt first, then packet B, and then packet A. This is due to the way the Sequence Number (SN) and Timestamp (TS) information is signaled in the ROHC headers. Because there is only incremental data available, the packets are rebuilt by working backwards from the IR.

In an exemplary embodiment, CRC information in the ROHC packet headers can be used to check the validity of the header information re-created as described above. In U-mode ROHC, for example, the ROHC header of each packet includes a CRC. For packets such as A, B and C that have been decompressed using information re-created from information contained in another IR packet, such as IR2, the decompressor can test the validity of the re-created information by calculating the CRC for each packet after decompression and comparing it to the CRC contained in the packet header as received. If there is a match, then it can be determined that the re-created data is valid and the packet can be forwarded to the client. If there is no match, the packet may be discarded.

If an RTP/UDP/IP packet is compressed with ROHC, the receiver can decompress the RTP/UDP/IP headers and then apply the CRC to validate the resultant header. If a packet is lost, however, there can be ambiguity in the reconstructed packets. Thus, under normal operation without packet loss, packets P0, P1, P2, P3, ... are compressed by compressor 110 to ROHC packets R(P0), R(P1), R(P2), R(P3), ... and transmitted to decompressor 120 which decompresses the packets back to P0, P1, P2, P3, .... If, however, R(P2) is lost, for example, P2 cannot be reconstructed and because R(P2) contained differential information, it is possible that P3 will be reconstructed incorrectly.

A simple embodiment of a receiver simply ignores packets R(P3), R(P4), ... until the next IR packet is received. A more complex embodiment of a receiver reconstructs P3 and checks its CRC. If the CRC passes, then the receiver continues to decode the subsequent packets P4, P5, ..., otherwise it stops decoding and waits for the next IR packet. In yet another embodiment of a receiver, if the CRC fails, the contents of P3 are varied (such as for example, by incrementing the SN and TS by an amount predicted based on the missing packets), the CRC is re-calculated based on the varied contents, and the CRC is tried again. This procedure of varying the packet contents and re-trying the CRC can be repeated until the CRC passes or some event occurs, such as, for example, the elapsing of a predetermined time period.

Where packets are rebuilt in reverse order, as described above, it may not be guaranteed that the packets can be generated unambiguously, even without lost packets. Preferably, therefore, a check of the CRC is performed. Additionally, an iterative procedure of varying the packet contents and re-checking the CRC, as described, can be used.

Figure 6:
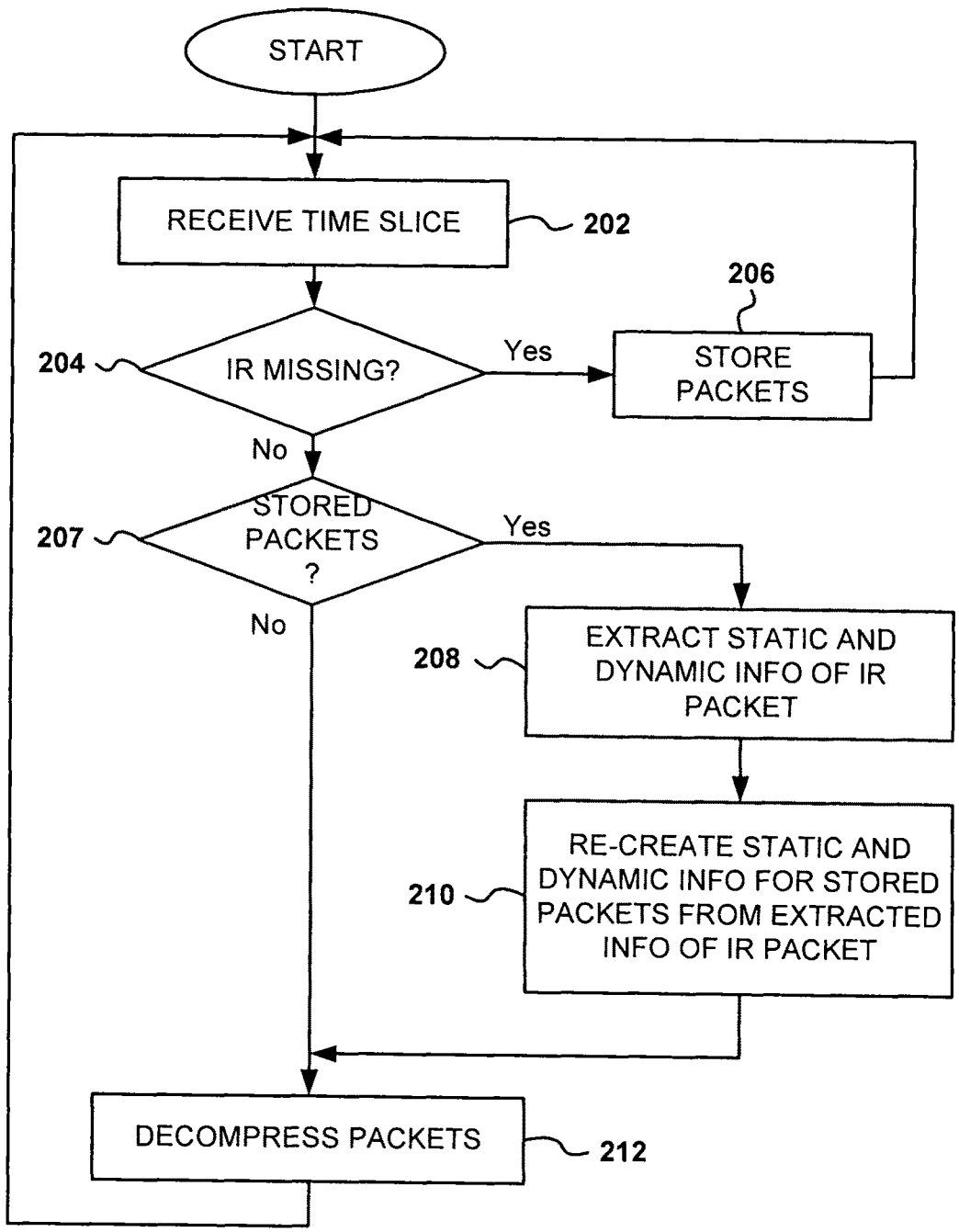
FIG. 6 is a flowchart of an exemplary embodiment of a method of using the contents of a later-received IR packet to decompress earlier-received packets in accordance with the present disclosure.

FIG. 6 shows a flowchart of an exemplary embodiment of a method in accordance with the above description. As shown in FIG. 6, at step 202, a time slice containing multiple packets, such as those shown in FIGS. 2 and 3, is received by the decompressor. The decompressor examines the time slice and if it is determined at 204 that the time slice lacks an IR packet, as in FIG. 3, operation proceeds to step 206. At step 206, the compressed packets received in the current time slice are stored for later decompression in the expectation that a subsequent time slice is received with an IR packet containing context information that can be used to decompress the packets. Operation then returns to step 202 for reception of another time slice.

If it is determined at step 204 that the current time slice was received with an IR packet, as in the scenario depicted in FIG. 2, operation proceeds to step 207 in which the decompressor checks whether there are any compressed packets from a previous time slice that were stored in step 206 awaiting decompression. If not, operation proceeds to step 212 in which the packet headers received in the current time slice are decompressed in accordance with the context information provided in the IR packet received in the current time slice.

If it is determined at step 207 that there are stored compressed packets from a previous time slice awaiting decompression, operation proceeds to step 208, in which information in the current IR packet is extracted. The extracted information is then used in step 210 to re-create the static and dynamic information for the stored packets whose associated IR packet was lost. As described above, the step of re-creating the context information may include re-using some or all of the extracted static and/or dynamic information and/or deriving context information from some or all of the extracted static and/or dynamic information. Operation then proceeds to step 212 in which the stored packets are decompressed in accordance with the context information thus re-created. In addition, the packets received in the current time slice are also decompressed in accordance with the extracted information. Operation then returns to step 202 for reception of another time slice.

Although exemplary embodiments have been disclosed above with reference to burst modes of operation, with packets transmitted in bursts or time slices, the principles of the invention are also applicable to streaming modes of operation as well, in which packets are sent in continuous streams.

In a further exemplary embodiment, a ROHC decompressor uses an earlier-received context-rich packet to decompress later received packets for which no context information was received. The exemplary ROHC decompressor, instead of throwing out packets for which it lacks any contextual information, uses an earlier-received context-rich packet, such as an IR packet, to re-create the context information pertaining to the later received packets. The context information thus re-created is then used to decompress the received packets. In an exemplary embodiment, only the information that is used in decoding the data packets is determined or estimated. In other embodiments, the entire IR packet is determined or estimated.

In yet a further exemplary embodiment, a ROHC decompressor uses an earlier-received context-rich packet and a later-received context-rich packet to decompress packets for which no context information was received. The exemplary ROHC decompressor, instead of throwing out packets for which it lacks any contextual information, uses a combination of context-rich packets such as IR packets, preceding and following packets for which no context information was received, to re-create the context information pertaining to the packets. For example, in an RTP application, information such as the SN and TS of a lost IR packet can be determined by interpolating the corresponding values in the earlier and later IR packets that were correctly received. The context information thus re-created is then used to decompress the packets. In an exemplary embodiment, only the information that is used in decoding the data packets is determined or estimated. In other embodiments, the entire IR packet is determined or estimated.

Note also, that although a proximate IR packet—such as an IR packet immediately preceding or immediately following a lost IR packet—will most likely contain the most accurate information for re-creating the contents of the lost IR packet, it may be possible to also use information from further removed IR packets, particularly if the validity of the information in a more proximate IR packet is in doubt.

Various exemplary embodiments in accordance with the invention are possible. For example, in an exemplary embodiment, a method is provided for re-creating all or part of a lost IR packet in an ROHC system, using a different IR packet. In another exemplary embodiment, a method is provided for processing, such as, for example, decoding data that depends on the lost IR packet, the processing being done with the use of the re-created IR packet. In a further exemplary embodiment, a processing device is provided that performs the aforementioned re-creating and/or processing methods. In yet a further exemplary embodiment, a device is provided, such as for example a pre-processor, an encoder, a transmitter, a receiver, a decoder, a post-processor, a set-top box, a cell-phone, a laptop or other personal computer, a PDA, or other consumer communications equipment, containing the aforementioned processing device.

Embodiments in accordance with the present invention may be adapted to a variety of applications. For example, embodiments may be used in the context of coding video and/or other types of data. Additionally, embodiments may be used in the context of, or adapted for use in the context of, a standard. One such standard is the ATSC-M/H standard, but other standards (existing or future) may apply. Of course, embodiments need not be used in a standard.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants (PDAs), and other devices that facilitate communication of information between end-users.

Implementations of the various processes and features described herein may be embodied in a variety of different equipment or applications, particularly, for example, equipment or applications associated with data encoding and decoding. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a computer, and such instructions (and/or data values produced by an implementation) may be stored on a computer-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a computer-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a computer-readable medium (such as a storage device) having instructions for carrying out a process. Further, a computer-readable medium may store, in addition to or in lieu of instructions, data values produced by an implementation.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this disclosure and are within the scope of this disclosure.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied in one, or more, integrated circuits (ICs). Similarly, although shown as separate elements, some or all of the elements may be implemented in a stored-program-controlled processor, e.g., a digital signal processor or a general purpose processor, which executes associated software, e.g., corresponding to one, or more, steps, which software may be embodied in any of a variety of suitable storage media. Further, the principles of the invention are applicable to various types of wireless communications systems, e.g., terrestrial broadcast, satellite, Wireless-Fidelity (Wi-Fi), cellular, etc. Indeed, the inventive concept is also applicable to stationary or mobile transmitters and receivers. It is therefore to be understood that numerous modifications may be made to the illustrative embodiments and that other arrangements may be devised without departing from the spirit and scope of the present invention.

The invention claimed is:

1. A backward looking apparatus for decompressing compressed data packets comprising:
a receiver for receiving a first compressed data packet transmitted in a first time slice and an initialization packet after the first compressed data packet, wherein the initialization packet contains context information and is first transmitted in a second time slice following the first time slice and contains context information pertaining to the second time slice;
a processor for re-creating context information for decompressing the first compressed data packet from the context information contained in the initialization packet, wherein the processor derives context information from the context information contained in the initialization packet; and
the processor decompressing the first compressed data packet using the re-created context information,
wherein the receiver receives a second compressed data packet after the initialization packet, and the processor decompresses the second compressed data packet using the context information contained in the initialization packet.

2. The apparatus of claim 1, wherein the first compressed data packet is a Robust Header Compression (ROHC) packet.

3. The apparatus of claim 2, wherein the initialization packet is an Initialization and Refresh (IR) packet.

4. The apparatus of claim 1, wherein the first compressed data packet is a Real-time Transport Protocol (RTP) packet.

5. The apparatus of claim 4, wherein the re-created context information includes at least one of a timestamp, a timestamp stride, and a sequence number.

6. The apparatus of claim 1, wherein the first compressed data packet is received in a first data burst and the initialization packet is received in a second data burst.

7. The apparatus of claim 1, wherein re-creating context information includes re-using context information contained in the initialization packet.

8. The apparatus of claim 1 comprising:
a processor for determining a cyclic redundancy code (CRC) for the decompressed first compressed data packet, and comparing the determined CRC to a CRC contained in the first compressed data packet.

9. The apparatus of claim 1, wherein the receiver receives an earlier initialization packet before the first compressed data packet, wherein the earlier initialization packet contains context information, and wherein the context information for decompressing the first compressed data packet is re-created from the context information contained in the initialization packet and the context information contained in the earlier initialization packet.

\* \* \* \* \*